United States Patent
Dickenson

(10) Patent No.: US 10,808,522 B2
(45) Date of Patent: Oct. 20, 2020

(54) DISTRIBUTED FIBER OPTIC MONITORING OF VIBRATION TO GENERATE A NOISE LOG TO DETERMINE CHARACTERISTICS OF FLUID FLOW

(71) Applicant: SCHLUMBERGER TECHNOLOGY CORPORATION, Sugar Land, TX (US)

(72) Inventor: Paul Dickenson, Southampton (GB)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 199 days.

(21) Appl. No.: 15/325,209

(22) PCT Filed: Jul. 10, 2014

(86) PCT No.: PCT/US2014/046169
§ 371 (c)(1),
(2) Date: Jan. 10, 2017

(87) PCT Pub. No.: WO2016/007161
PCT Pub. Date: Jan. 14, 2016

(65) Prior Publication Data
US 2017/0191363 A1 Jul. 6, 2017

(51) Int. Cl.
*E21B 47/107* (2012.01)
*E21B 47/113* (2012.01)
(Continued)

(52) U.S. Cl.
CPC .......... *E21B 47/107* (2020.05); *E21B 47/113* (2020.05); *E21B 47/135* (2020.05);
(Continued)

(58) Field of Classification Search
CPC ....... E21B 47/101; E21B 47/123; G01F 1/666
See application file for complete search history.

(56) References Cited

U.S. PATENT DOCUMENTS 7,219,762 B2 * 5/2007 James .................. G01V 1/50
181/105
7,283,216 B1 * 10/2007 Geng .................... G01B 11/18
356/35.5

(Continued)

FOREIGN PATENT DOCUMENTS

WO 2005116601 A2 12/2005
WO 2010136768 A2 12/2010
(Continued)

OTHER PUBLICATIONS

International Search Report and Written for corresponding PCT Application Serial No. PCT/US2014/046169, dated Mar. 11, 2015, 16 pages.

*Primary Examiner* — John Fitzgerald

(57) ABSTRACT

Distributed fiber optic monitoring of vibration within a region of interest includes acquiring distributed vibration data from optical backscatter generated in response to an interrogating pulse of optical energy launched into an optical fiber deployed in a region of interest having a fluid flow, and generating a noise log from the distributed vibration data that includes a plurality of traces representing vibration energy above or below selected frequencies at a plurality of locations in the region of interest. Characteristics of the fluid flow in the region of interest are then determined based on the noise log.

14 Claims, 4 Drawing Sheets

(51) Int. Cl.
*E21B 47/135* (2012.01)
*G01F 1/66* (2006.01)
*E21B 47/117* (2012.01)

(52) U.S. Cl.
CPC .............. *G01F 1/661* (2013.01); *G01F 1/666* (2013.01); *E21B 47/117* (2020.05)

(56) References Cited

U.S. PATENT DOCUMENTS

| | | | | |
|---|---|---|---|---|
| 7,397,976 | B2* | 7/2008 | Mendez | E21B 47/06 |
| | | | | 385/12 |
| 7,946,341 | B2 | 5/2011 | Hartog et al. | |
| 8,225,867 | B2 | 7/2012 | Hartog et al. | |
| 8,326,540 | B2 | 12/2012 | Hull et al. | |
| 8,347,958 | B2 | 1/2013 | Hartog et al. | |
| 8,930,143 | B2* | 1/2015 | Sierra | E21B 47/065 |
| | | | | 702/6 |
| 8,950,482 | B2* | 2/2015 | Hill | E21B 43/11857 |
| | | | | 166/250.1 |
| 8,997,585 | B2* | 4/2015 | Hayward | E21B 47/123 |
| | | | | 73/861.27 |
| 9,228,889 | B2* | 1/2016 | McCann | G01H 9/004 |
| 9,416,644 | B2* | 8/2016 | McEwen-King | E21B 43/26 |
| 9,546,548 | B2* | 1/2017 | Hartog | E21B 47/101 |
| 9,982,526 | B2* | 5/2018 | Davydov | E21B 47/107 |
| 2006/0165344 | A1* | 7/2006 | Mendez | E21B 47/06 |
| | | | | 385/13 |
| 2009/0114386 | A1* | 5/2009 | Hartog | E21B 43/26 |
| | | | | 166/250.08 |
| 2010/0018703 | A1* | 1/2010 | Lovell | E21B 17/206 |
| | | | | 166/255.2 |
| 2010/0207019 | A1* | 8/2010 | Hartog | E21B 47/101 |
| | | | | 250/269.1 |
| 2010/0215360 | A1 | 8/2010 | Weng et al. | |
| 2011/0088462 | A1* | 4/2011 | Samson | E21B 47/10 |
| | | | | 73/152.18 |
| 2011/0185815 | A1* | 8/2011 | McCann | G01H 9/004 |
| | | | | 73/655 |
| 2011/0188344 | A1* | 8/2011 | Hartog | E21B 43/26 |
| | | | | 367/27 |
| 2011/0280103 | A1* | 11/2011 | Bostick, III | E21B 47/101 |
| | | | | 367/35 |
| 2012/0013893 | A1* | 1/2012 | Maida | E21B 47/123 |
| | | | | 356/73.1 |
| 2012/0014211 | A1* | 1/2012 | Maida, Jr. | E21B 47/09 |
| | | | | 367/13 |
| 2012/0067118 | A1 | 3/2012 | Hartog et al. | |
| 2012/0111560 | A1* | 5/2012 | Hill | E21B 43/11857 |
| | | | | 166/250.1 |
| 2012/0277995 | A1* | 11/2012 | Hartog | E21B 43/26 |
| | | | | 702/8 |
| 2013/0061688 | A1* | 3/2013 | Hayward | E21B 47/123 |
| | | | | 73/861.27 |
| 2013/0091942 | A1* | 4/2013 | Samson | E21B 47/10 |
| | | | | 73/152.18 |
| 2013/0092371 | A1* | 4/2013 | Hartog | E21B 47/06 |
| | | | | 166/250.01 |
| 2013/0113629 | A1 | 5/2013 | Hartog et al. | |
| 2013/0167628 | A1 | 7/2013 | Hull et al. | |
| 2013/0122537 | A1 | 9/2013 | McEwen-King et al. | |
| 2013/0233537 | A1* | 9/2013 | McEwen-King | E21B 43/26 |
| | | | | 166/250.1 |
| 2013/0333474 | A1* | 12/2013 | Godfrey | G01M 3/243 |
| | | | | 73/592 |
| 2014/0022530 | A1 | 1/2014 | Farhadiroushan et al. | |
| 2014/0036627 | A1* | 2/2014 | Hull | G01V 1/001 |
| | | | | 367/26 |
| 2015/0034306 | A1* | 2/2015 | Hull | E21B 47/04 |
| | | | | 166/250.01 |
| 2016/0146962 | A1* | 5/2016 | Hayward | E21B 43/26 |
| | | | | 166/250.1 |
| 2016/0320232 | A1* | 11/2016 | Nunes | G01M 3/24 |
| 2017/0075029 | A1* | 3/2017 | Cuny | G01V 13/00 |
| 2018/0094952 | A1* | 4/2018 | Handerek | G01H 9/004 |

FOREIGN PATENT DOCUMENTS

| | | |
|---|---|---|
| WO | 2010136773 A2 | 12/2010 |
| WO | 2010136810 A2 | 12/2010 |
| WO | 2011091505 A1 | 8/2011 |
| WO | 2011148128 A1 | 12/2011 |
| WO | 2012158371 A2 | 11/2012 |
| WO | 2013008035 A2 | 1/2013 |
| WO | 2013045941 A1 | 4/2013 |
| WO | 2013102252 A1 | 7/2013 |
| WO | 2013132227 A2 | 9/2013 |

\* cited by examiner

DISTRIBUTED FIBER OPTIC MONITORING OF VIBRATION TO GENERATE A NOISE LOG TO DETERMINE CHARACTERISTICS OF FLUID FLOW

BACKGROUND

Various fluids, including water and hydrocarbons, can be obtained from a subterranean geologic formation, referred to as a reservoir, by drilling a well that penetrates the formation. Once a wellbore is drilled, various well completion components may be installed to control and enhance the efficiency of producing fluids from the reservoir. For hydrocarbon production, a wide variety of techniques have been employed to control and enhance production efficiency, including those that involve monitoring fluid flow both out of and into the well. Monitored information can be used to determine parameters relating to the fluid, such as the location of fluid inflow or outflow fluid, the proportion of fluid entering or leaving each section of the well, the rate of fluid flow, volume of fluid, composition of the flow, and the like. One type of monitoring system which may be installed in a wellbore is a fiber optic based sensing system.

Fiber optic sensors employ the fact that environmental effects, such as pressure, strain, vibration, and temperature, can alter the amplitude, phase, frequency, spectral content, or polarization of light propagated through an optical fiber. Advantages of fiber optic sensors include their light weight, small size, passive nature, energy efficiency, ruggedness, and immunity to electromagnetic interference. In addition, fiber optic sensors have the potential for very high sensitivity, large dynamic range, and wide bandwidth. Yet further, certain classes of sensors can be distributed along the length of an optical fiber so that an appropriate interrogation system can be employed to monitor selected environmental parameters at multiple locations at the same time. When deployed in a hydrocarbon well, the parameters can provide indications of characteristics of production fluids and/or properties of the surrounding earth formation. Various drilling, production and remedial operations can then be performed based on the information derived from the monitored parameters.

BRIEF DESCRIPTION OF THE DRAWINGS

Certain embodiments of the invention are described with reference to the accompanying drawings, wherein like reference numerals denote like elements. It should be understood, however, that the accompanying drawings illustrate only the various implementations described herein and are not meant to limit the scope of various technologies described herein. The drawings show and describe various embodiments of the current invention.

DETAILED DESCRIPTION

Figure 1:
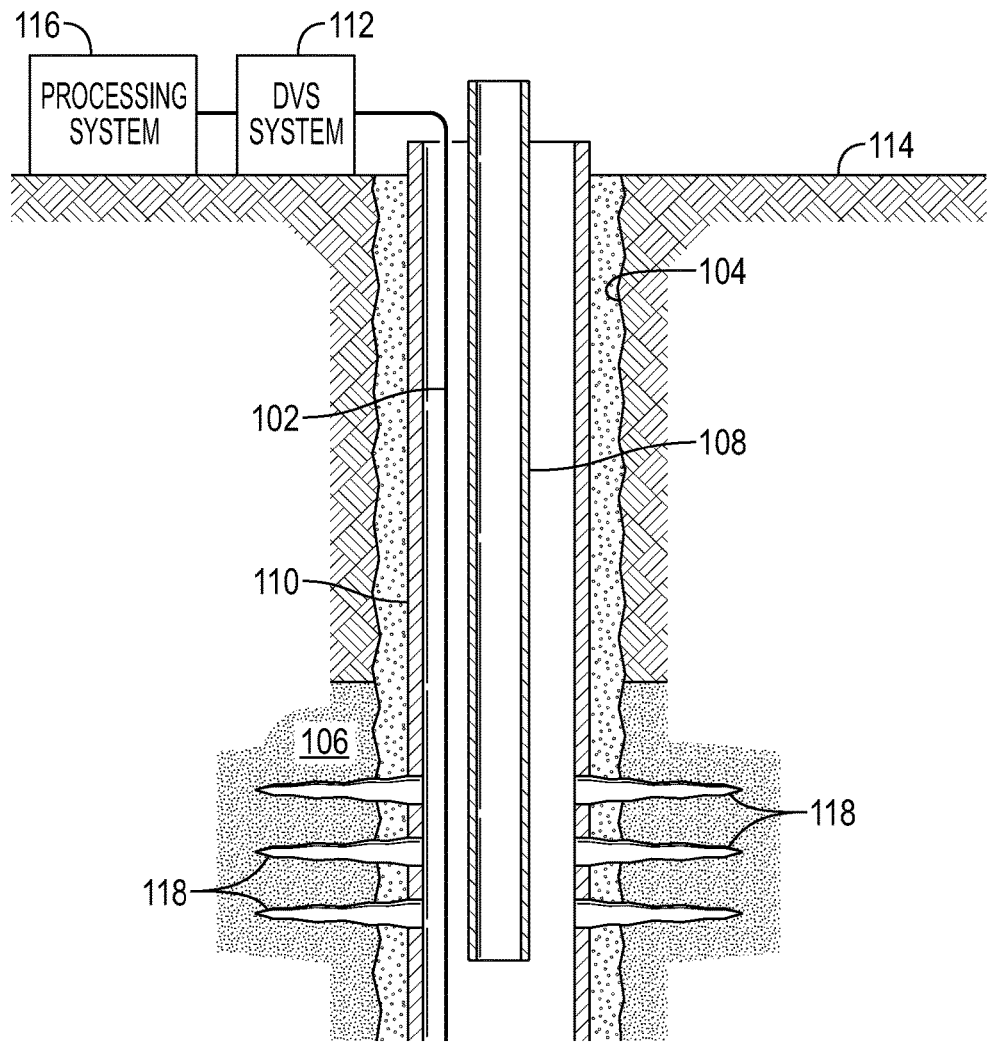
FIG. 1 is a schematic illustration of an exemplary distributed vibration sensing (DVS) system deployed in a wellbore to monitor physical phenomena associated with fluid flow, according to an embodiment.

In the following description, numerous details are set forth to provide an understanding of the present invention. However, it will be understood by those skilled in the art that the present invention may be practiced without these details and that numerous variations or modifications from the described embodiments may be possible.

In the specification and appended claims: the terms "connect", "connection", "connected", "in connection with", and "connecting" are used to mean "in direct connection with" or "in connection with via one or more elements"; and the term "set" is used to mean "one element" or "more than one element". Further, the terms "couple", "coupling", "coupled", "coupled together", and "coupled with" are used to mean "directly coupled together" or "coupled together via one or more elements". As used herein, the terms "up" and "down", "upper" and "lower", "upwardly" and "downwardly", "upstream" and "downstream"; "above" and "below"; and other like terms indicating relative positions above or below a given point or element are used in this description to more clearly describe some embodiments of the invention.

Reservoir monitoring generally involves determining downhole parameters at various locations in a producing well over an extended period of time. Available tools for monitoring downhole parameters include wireline devices that are lowered into the well during production. In general, wireline monitoring involves transporting the wireline tools to the wellsite, conveying the tools into the wellbore, shutting down the production, making measurements over extended periods of time and processing the resultant data. However, the use of a wireline tool is an invasive technique which can interrupt production or affect other operations being performed in the wellbore.

Characteristics of fluid flow in a well are of particular interest. In general, one way to detect fluid flow is to monitor vibration or acoustic noise in a region of interest. This vibration or acoustic noise can be logged as a function of location and, thus, provide valuable information that can be used to control and/or enhance production or to perform remedial measures. Known noise tools, such as hydrophones, can be used to detect acoustic noise. However, these tools are suited only for point measurements at a particular location or, at most, multiple locations within a confined region. As such, wireline tools must be moved up and down in the well to provide a full production log of the entire region of interest. Not only is this procedure time consuming, but the wireline tools typically are not ideally suited for monitoring simultaneous events at multiple locations within an extensive region or for long period deployments.

Other fluid flow monitoring systems have been implemented using distributed temperature sensing (DTS) techniques that employ an optical fiber sensor. In such systems, information on fluid flow can be derived by comparing an observed temperature to a temperature that is expected based on knowledge of the geothermal gradient in the region of interest. For instance, the geothermal gradient can be measured while the well is shut in. A DTS optical fiber can be permanently installed in the well, thus eliminating the need for an intervention and interruption of production to log the fluid flow characteristics of the well. However, effective use of a DTS system is limited to vertical wells, where there is a geothermal gradient. Thus, a DTS system is not well suited for providing information about fluid flow in horizontal wells or wells that are only slightly deviated. And, even in vertical wells or other wells that do have a geothermal gradient, the derived fluid flow information is subject to uncertainty since many conditions in the wellbore other than fluid flow can affect the measured temperature.

Fluid flow monitoring is not only useful to control and enhance production efforts, but it also is useful to assess the integrity of the well. For instance, information about the location and extent of flow behind the well casing can be indicative of leaks through the casing, poor cementing and generally poor wellbore integrity. Available techniques for detecting such leaks include using individual hydrophones or an array of individual hydrophones to generate a noise log. Energy in certain bands of the noise log are assumed to originate from leaks. However, again, the individual sensors or array of sensors can only provide point measurements within a limited region so that a full noise log would require the time consuming process of moving the hydrophones to different locations in the well, waiting sufficient time for conditions to stabilize after movement of the hydrophones and then repeating the measurements. This process also means that the different point measurements that make up the noise log are taken at different times, thus creating uncertainties in the processing and interpretation of the data. In addition, because the information in such noise logs is taken at different times, the logs may fail to capture transient events (e.g., a gas slug entrained in the production fluid) that also can provide valuable information about fluid flow.

The techniques discussed above involve measurements of fluid flow that are taken during production or while the well is shut in (for example, when looking for leaks). However, it is also useful to measure fluid flow leaving the well during fracturing and stimulation operations that are intended to enhance production. This information can be used to determine the effectiveness of a stimulation treatment and then to target further interventions.

Fluid flow information from injector wells also can be useful. Injector wells are used to enhance recovery or to store fluids in a reservoir. If the location and extent of fluid flow in an injector well can be determined, this information can be used to ensure uniform injection across the reservoir or to target a specific zone of the reservoir.

Accordingly, various embodiments of the systems and techniques described herein are arranged to monitor fluid flow in a region of interest, such as in a production well, an injector well, a conduit or other region or structure where there is fluid flow. As described herein, embodiments of the system and techniques employ distributed vibration sensing (DVS) or distributed acoustic sensing (DAS) to monitor fluid inflow and/or outflow conditions in a wellbore, conduit and/or reservoir. For convenience, both DVS and DAS techniques will be commonly referred to as DVS throughout this disclosure. The DVS techniques use an optical fiber sensor that is suited to provide a distributed response along its length to vibration and/or acoustic events in the region of interest in which the optical fiber is installed. Such optical fiber sensors do not rely on special modification, such as Bragg gratings, to provide a response, but instead generate backscatter that is reflected from small imperfections in the fiber itself. When the fiber is subjected to strain (such as from vibration or acoustic signals), the distances between the imperfections change. Consequently, the backscattered light also changes. By monitoring the changes in the backscatter light generated by the fiber in response to interrogating pulses of optical energy, it is possible to determine the dynamic strain, or vibration, experienced by the fiber.

Such a distributed optical fiber can be permanently or removably installed in a well and optically coupled with a surface interrogation and data acquisition system. In such embodiments, the fiber can be used to obtain DVS measurements indicative of the location and extent of fluid inflow and outflow during both production and interventions. The optical fiber can also be deployed in injector wells. Because the optical fiber is configured to provide a distributed response to vibration along its length, the DVS measurements can be acquired continuously over time along the entire region of interest, without moving the optical fiber sensor. Consequently, noise logs of the entire region of interest within a well can be generated that represent downhole parameters in the well within the entire region of interest that have been observed simultaneously. Because distributed measurements allow data to be acquired simultaneously from all locations within the entire region, logging can be performed much more quickly and transient conditions can be detected and tracked. Moreover, because the DVS optical fiber sensor can provide information indicative of the sensed parameters continuously along its length, higher resolution measurements than might be achieved by point sensors or arrays of point sensors can be obtained. Yet further, because the DVS system and techniques respond to vibration or acoustic events in the well (as opposed to temperature), the monitoring system and techniques are effective to monitor fluid flow in wells or other structures or regions where there is no distinct geothermal gradient.

In some embodiments, the systems and techniques described herein may be employed in conjunction with an intelligent completion system disposed within a well that penetrates a hydrocarbon-bearing earth formation. Portions of the intelligent completion system may be disposed within cased portions of the well, while other portions of the system may be in the uncased, or open hole, portion of the well. The intelligent completion system can comprise one or more of various components or subsystems, which include without limitation: casing, tubing, control lines (electric, fiber optic, or hydraulic), packers (mechanical, sell or chemical), flow control valves, sensors, in flow control devices, hole liners, safety valves, plugs or inline valves, inductive couplers, electric wet connects, hydraulic wet connects, wireless telemetry hubs and modules, and downhole power generating systems. Portions of the systems that are disposed within the well can communicate with systems or sub-systems that are located at the surface. The surface systems or subsystems in turn can communicate with other surface systems, such as systems that are at locations remote from the well.

An exemplary arrangement 100 for determining fluid inflow and outflow information in a well that penetrates a hydrocarbon-bearing earth formation is illustrated in FIG. 1. The arrangement 100 uses DVS measurements to provide information indicative of fluid flow. In FIG. 1, a fiber optic cable which includes an optical fiber 102 can be deployed in a wellbore 104 to observe physical parameters associated with a region of interest 106 (e.g., a reservoir). In some embodiments, the fiber 102 may be deployed in the annulus between a production tubing 108 and a casing 110 as shown. A DVS interrogation and acquisition system 112 can be located at a surface 114 and coupled to the optical fiber 102 to transmit interrogating pulses to the optical fiber 102 and detect backscattered optical signals returned by the optical fiber 102. The detected backscatter can be processed by a processing system 116 to determine parameters of interest (e.g., vibration, noise). The processing system 116 can be co-located with the DVS interrogation and acquisition system 112 (as shown), can be in the same vicinity as the system 112, or can be remotely located and the data representative of the detected parameters may be transmitted via satellite or other communication network to the remote location, such as a remote control center.

In the embodiment shown in FIG. 1, to reach the region of interest 106, the wellbore 104 is drilled through the surface 114 and the casing 110 is lowered into the wellbore 104. Perforations 118 are created through the casing 110 to establish fluid communication between the wellbore 104 and the formation in the region of interest 106. The production tubing 108 is then installed and set into place such that production of fluids through the tubing 108 can be established. Although a cased vertical well structure is shown, it should be understood that embodiments of the subject matter of this application are not limited to this illustrative example. Uncased, open hole, gravel packed, deviated, horizontal, multi-lateral, deep sea or terrestrial surface injection and/or production wells (among others) can incorporate a DVS monitoring system as described. In many applications, vibration and/or acoustic measurements obtained from the region of interest 106 can provide useful information that may be used to increase productivity. For instance, the measurement may provide an indication of the characteristics of a production fluid, such as flow velocity, flow composition, and inflow location, or an indication of well integrity, such as leaks in the casing 110. This information then can be used to implement various types of production or remedial operations, such as controlling valves to prevent production from certain zones or to adjust the flow rate, controlling an injection profile, etc.

Figure 2:
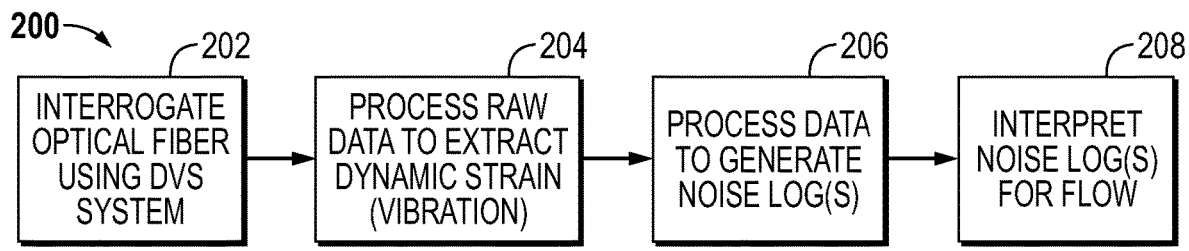
FIG. 2 is a flow diagram of an exemplary workflow to generate a noise log using the data acquired by the DVS system of FIG. 1, according to an embodiment.

In various embodiments, fluid inflow and/or outflow information associated with a region of interest, such as the region 106 in FIG. 1, can be derived using the exemplary workflow 200 shown in FIG. 2. In block 202, the optical fiber sensor, such as the fiber 102 deployed in the wellbore 104, is interrogated using the DVS interrogation system 112 to launch optical pulses into the fiber 102 and detect optical signals reflected from the fiber 102 in response to the launched pulses. At block 204, the detected optical signals are processed to extract information representative of the dynamic strain (or vibration) imparted on the optical fiber 102. At block 206, the extracted strain information is further processed to generate a noise log, such as the exemplary noise log 300 shown in FIG. 3A. Finally, at block 208, the noise log 300 is interpreted to derive information corresponding to the inflow and/or outflow of fluid at various locations within the region of interest 106. Further exemplary details of each step in the workflow 200 are discussed below.

Figure 4:
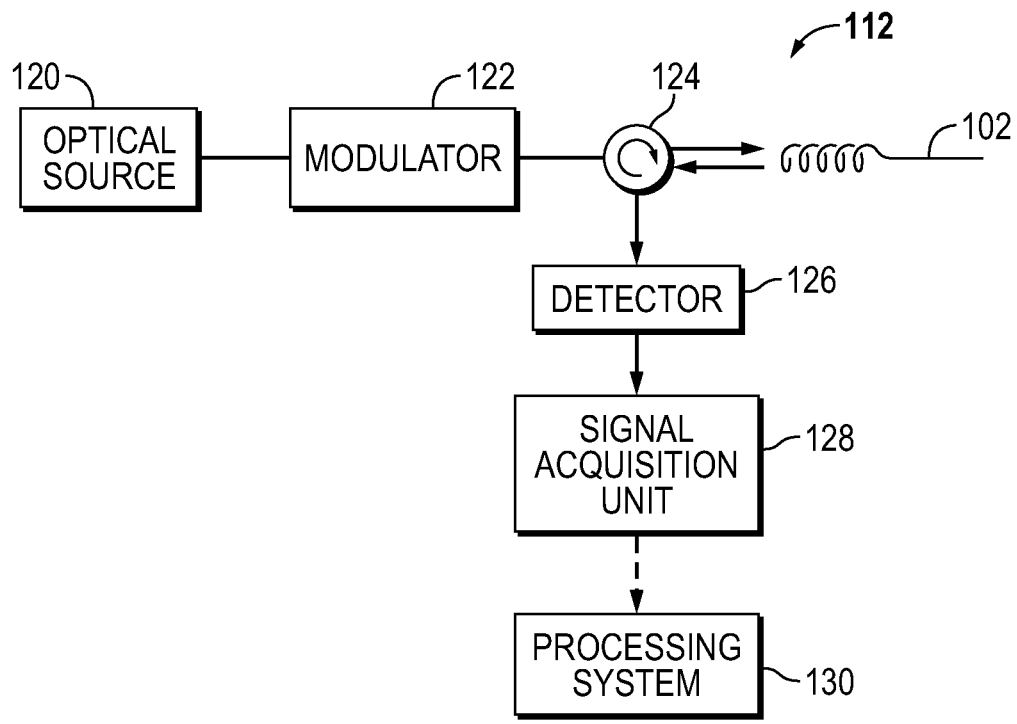
FIG. 4 is a schematic illustration of a DVS interrogation and acquisition system that can be used in the DVS system of FIG. 1, according to an embodiment.

Starting first with block 202, and with further reference to FIGS. 1 and 4, the DVS interrogation and acquisition system 112 used to interrogate the optical fiber 102 can be located at the surface 114 in the vicinity of the wellhead. The optical fiber 102 can be any of a variety of types of optical fibers that are configured to provide a distributed response to vibration incident along its length. For instance, the fiber 102 can be a multimode mode fiber and can be used for both DVS and DTS measurements, or it can be a single mode fiber used only for DVS measurements. In addition, the fiber 102 can be configured so that it has enhanced sensitivity to vibration, such as by incorporating coatings or geometries that enhance the transfer of the incident vibration to the fiber optic core.

Regardless of the particular fiber 102 used, the DVS system 112 can include an optical source 120 (e.g., a laser) to generate a narrowband optical signal. As shown in FIG. 4, the optical source 120 can be coupled to a modulator 122 that generates one or more pulses of optical energy to launch into the fiber 102 (which is deployed in a region of interest) through a circulator or directional coupler 124. In the example of FIG. 4, the optical fiber 104 is deployed along the wellbore 104, such as along the production tubing 108. As the launched pulses travel along the length of the optical fiber 102, small imperfections in the fiber 102 reflect a portion of the pulses, generating backscatter. When the fiber 102 is subjected to strain (such as from vibration or acoustic waves traveling in the region of interest), the distances between the imperfections change. Consequently, the backscattered light also changes. By monitoring the changes in the backscatter light generated by the fiber 102 in response to interrogating pulses, it is possible to determine the dynamic strain, or vibration, experienced by the fiber 102.

As shown in FIG. 4, the backscatter light generated by the fiber 102 passes through the coupler 124 and is detected by the optical detector 126 and then converted into an electrical signal. The electrical signals that emerge from the detector 126 are then processed by a signal acquisition unit 128, which extracts the desired information from the electrical signal that is indicative of the monitored vibration. In some instances, the system 112 can be configured as a direct detection system where the intensity (or amplitude) of the backscattered signals generated by the fiber sensor 102 is extracted by the acquisition unit 128 and then used to derive information relating to characteristics of the fluid flow in the region of interest 106. In other embodiments, the system 112 can be configured as a heterodyne DVS (or hDVS) system where the detection techniques implemented by the detector 126 provide for extraction of the phase of the backscattered signals by the acquisition unit 128. In such embodiments, the phase information (alone or along with the intensity information) can be used to derive the characteristics of the fluid flow. In yet other embodiments, the DVS system may be referred to as a distributed acoustic sensing (DAS) system. For convenience, the system 112 will be referred to herein as a DVS system regardless of whether it is configured as a direct detection system, an hDVS system, or a DAS system.

As shown in FIG. 4, the information acquired by the acquisition unit 128 can then be passed to a processing system 130, which then processes the information to generate, for instance, the noise log 300, as will be described further below. The processing system 130 can be part of the DVS system 112, or in the same location as the other components of the system 112, or can be remote from the system 112. The information generated by the acquisition unit 128 can be processed by system 130 in real time or near real time, or the information can be stored in a storage device (not shown) and processed at a later time.

The acquisition unit 128 and the processing system 130 can include respective processing devices (e.g., general purpose processor, microcontroller, etc.) for processing the DVS data and generating a noise log. Instructions for performing the processing can be stored on any computer readable medium, memory or other storage device.

The optical fiber 102 can be deployed in the wellbore 104 using a number of techniques. For instance, a thin metal tube, known as a control line, can be strapped to the production tubing 108. The fiber 102 can then be pumped through the control line using water, alcohol or another liquid. Alternatively, the fiber 102 can be incased by a cable that can also contain multiple optical fibers, electrical conductions and/or strength elements. The cable can be strapped to the tubing 108 upon installation or can later be fed into the well in the same manner as a wireline or slickline is deployed into the well. In yet other embodiments, a cable containing the optical fiber 102 can be placed inside coiled tubing which is then deployed into the well. The fiber 102 (or multiple fibers) can be wrapped in a thin metal shell which can be welded to produce a thin tube. In still further embodiments, the fiber 102 can be placed loose into the well without additional protection. In such embodiments, the fiber 102 can be considered to be disposable. Yet further techniques for deploying the fiber 102 in the region of interest 106 can be used as may be appropriate for the particular application and environment in which the monitoring system is employed.

The backscatter light that is generated by the fiber 102 in the DVS system 112 is referred to as Coherent Rayleigh Noise ("CRN"). Again, depending on the interrogation, detection and acquisition techniques used, the amplitude and/or phase of the detected CRN can be extracted and then used to derive information about the characteristics of the fluid flow in the region of interest. Extraction of the phase information can be particularly useful since the phase information provides a linear transfer function between the strain imparted on the optical fiber 102 and the backscattered signal detected by the DVS system 112, thus facilitating processing of the extracted data to produce a noise log.

Extraction of the phase and/or amplitude from the detected backscatter is represented in block 204 of FIG. 2. Generally, in some embodiments, a data set of extracted phase and/or amplitude information is obtained over a period of time, such as a period of a few seconds up to many minutes. Data can be recorded periodically. For example, the data can be recorded once every hour, or at such other periodicity as is suited for the particular application in which the system is implemented. The next block in FIG. 2 (i.e., block 206) addresses the generation of a noise log from the extracted amplitude or phase information.

Figure 3A:
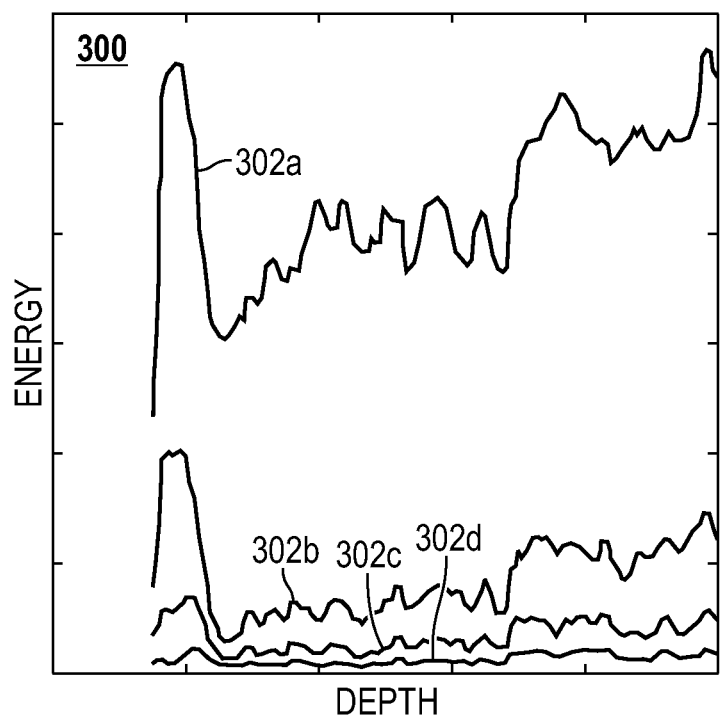
FIG. 3A is an exemplary noise log generated from a set of distributed vibration data acquired by the DVS system of FIG. 1 during a first time window, according to an embodiment.

An exemplary noise log 300 generated by embodiments of the invention is shown in FIG. 3A. The log 300 includes a plurality of traces 302a-d that represent the amplitude (or energy) of the monitored dynamic strain (i.e., vibration) versus depth (or location) within the region of interest (e.g., region 106). Each trace 302 represents the energy of the detected vibration at a particular frequency. In general, the frequencies that are selected for the noise log 300 are based on a priori knowledge of the expected characteristics of the fluid flow in the well. This knowledge can be gained through reservoir modeling or empirically by measurements obtained from a test well. The traces 302 for the noise log 300 in FIG. 3 are generated by high pass filtering the vibration data at the selected frequencies and then calculating the mean amplitude or energy of the filtered data over a selected time window within the data set, such as a period of tens of seconds.

Figure 3B:
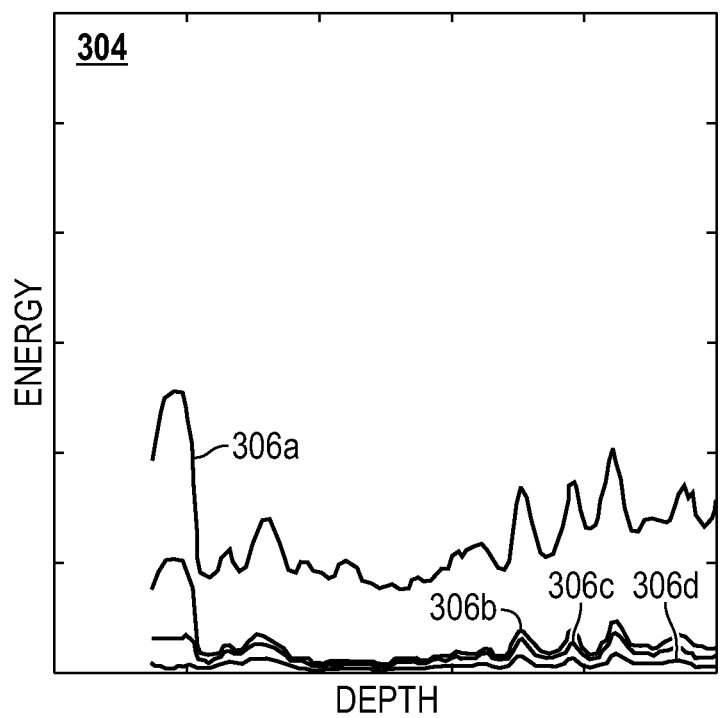
FIG. 3B is another exemplary noise log generated from a set of distributed vibration data acquired by the DVS system of FIG. 1 during a second time window, according to an embodiment.

A second exemplary log 304 is shown in FIG. 3B. The log 304 includes a plurality of traces 306a-d that represent the amplitude of the monitored dynamic strain versus depth with the region of interest. Each trace 306 represents the energy of the detected vibration at the same selected frequencies as shown in the log 300 of FIG. 3A. However, the log 304 in FIG. 3B has been generated from data in the data set falling within a different time window than the time window represented in FIG. 3A. A comparison of the logs 300 and 304 thus can provide information about transient events and/or changes in flow conditions over time within the region of interest.

Although two logs are shown in the Figures, it should be understood that any number of logs can be generated and compared using different time windows. The comparisons thus can effectively provide a dynamic noise log. In some embodiments, the dynamic noise log can be presented to the user as a video to show the evolution of the vibration recorded.

Figure 5:
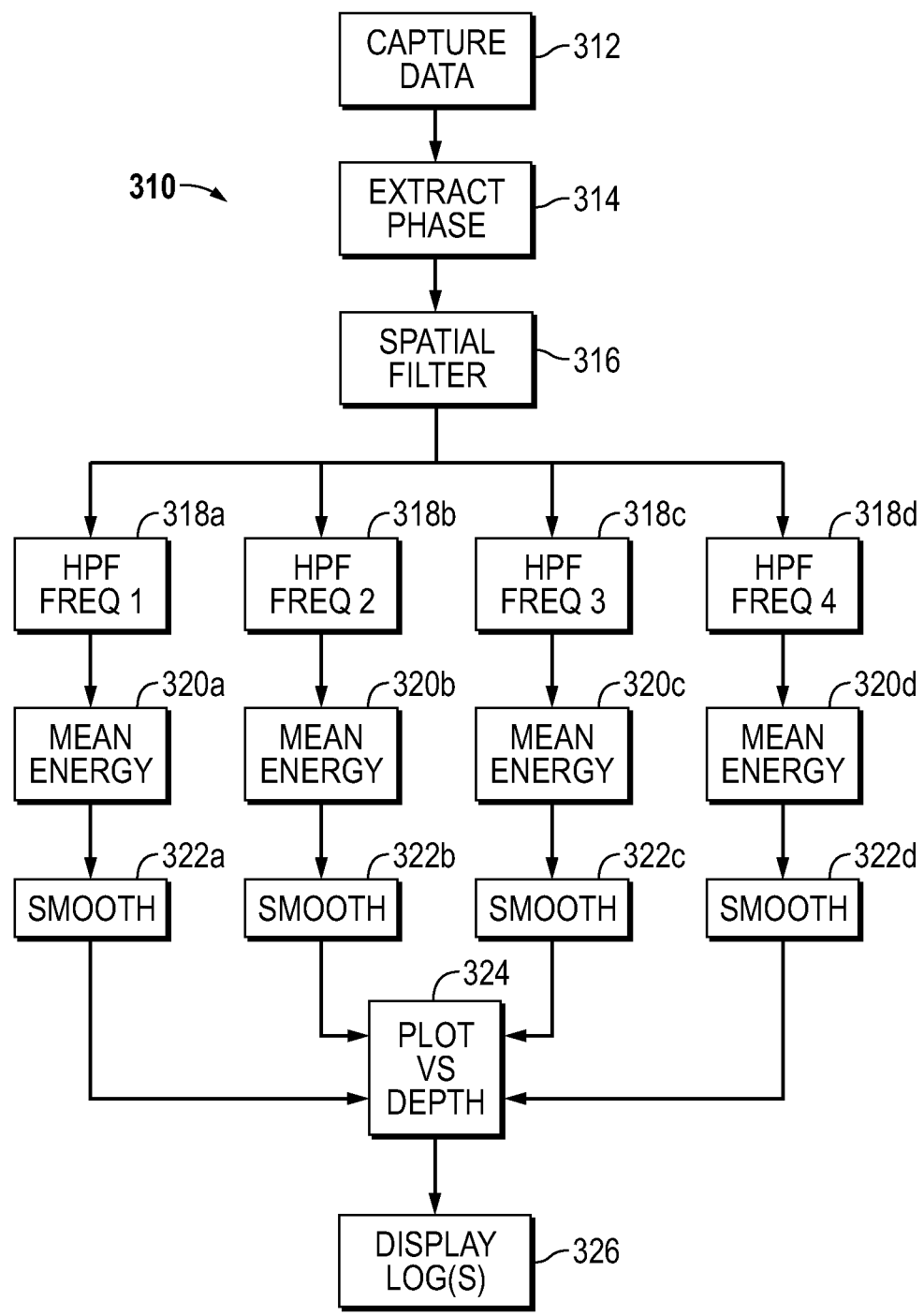
FIG. 5 is a flow diagram of an exemplary workflow showing further details of the workflow of FIG. 2, according to an embodiment.

An exemplary workflow 310 for generating a noise log 300/304 from DVS data is shown in FIG. 5. In block 312, the DVS data is acquired by launching one or more optical pulses generated by an optical source (e.g., a narrowband, coherent laser) into the optical fiber and detecting the returned backscatter which is in the form of Coherent Rayleigh Noise. At block 314, the phase of the DVS data is extracted, which is indicative of the dynamic strain experienced along the length of the optical fiber 102 where it is deployed in the region of interest 106. At block 316, the extracted phase information can be spatially filtered, such as by using a median filter, to remove isolated peaks in the data. Typically, these isolated peaks are produced by instrumentation or other artifacts, and thus may not be representative of the dynamic strain on the optical fiber 102.

At blocks 318a-d, the spatially filtered data is then subjected to high pass filtering (HPF) at multiple different selected frequencies. The frequencies are selected to highlight phenomena of interest. For example, the frequencies may be selected to highlight fluid flow through perforations in the casing, fluid flow through down-hole devices (e.g., a valve), fluid flow through gravel pack, fluid flow through slotted liners, fluid flow through sand screens, vibration caused by a pump, etc., each of which may be characterized by vibration at a different frequency. In addition, if structural vibration is believed to play an important role in analyzing fluid flow, then the filtering frequencies can be selected based on structural modeling of the well and its components. If the structural properties vary along the region of interest, then the filtering frequencies can be adjusted based on location. Alternatively, the results can be scaled to account for the effect of structure changes at the different locations.

In some embodiments, the spatially filtered data can be subjected to bandpass filtering or low pass filtering rather than high pass filtering. Regardless of the type of filtering, the goal is to highlight frequencies of interest with respect to monitoring fluid flow.

At blocks 320a-d, after filtering, the energy at each depth point or location in the region of interest is calculated for each set of filtered results. In some embodiments, the calculated energy can be a mean value, an average value, a median value, a root mean square value, a total value, etc. The definition of energy can be varied depending on the data. For example, energy can be defined as a sum of absolute amplitudes of vibration. Alternatively, energy can be defined as a sum of amplitude squared. Regardless of the definition, the final result is a trace 302 of energy versus depth/location for each filtering frequency, as shown in FIG. 3A.

In some instances, the traces 302 of energy versus depth can contain many peaks which can obscure the underlying shape of the data. This, in turn, can make the data difficult to interpret. In such cases, as shown in blocks 322a-c, it can be useful to smooth the energy data in the spatial domain, such as by using a boxcar filter or other suitable filter. In other embodiments, it may be more useful to preserve the difference between narrow high amplitude peaks and broad low amplitude peaks. In such a case, smoothing need not be performed.

In the block 324 of FIG. 5, a noise log, such as the log 300 in FIG. 3A, is produced by plotting the values of energy for each filtering frequency versus depth (or location). The fine depth resolution of DVS data provides a corresponding number of depth points for each trace 302, thus providing for increased granularity that can be useful for interpretation. For instance, the finer resolution can capture narrow peaks that are caused by both physical and spurious sources. The additional information (as compared to a noise log generated using point sensors) can enhance and facilitate the interpretation of the noise log to gain a better understanding of the flow regime in the region of interest.

The logs 300/304 are used as an interpretation tool for determining characteristics of the fluid flow in the region of interest 106. That interpretation may take into account other factors that affect fluid flow in the region of interest, such as the downhole geometry (e.g., direction changes, changes in diameter, etc.), the fluid properties (e.g., fluid composition, viscosity, temperature, etc.), the method used to deploy the optical fiber, the flow phenomena of interest (e.g., inflow, outflow, leaks), etc.

Various techniques can be used to interpret the noise logs 300/304. For instance, one option is to assume that the vibration caused by fluid flow lies entirely between two of the filtering frequencies. Using this assumption, the area between two traces, such as traces 302a and 302b, of the noise log 300 that correspond to those two frequencies is indicative of inflow. As such, a depth or location with large separation between two traces would indicate a large inflow, while a depth or location with small separation would indicate a small inflow. This same approach can be used to detect other flow phenomena with the filtering frequencies set accordingly.

Figure 6:
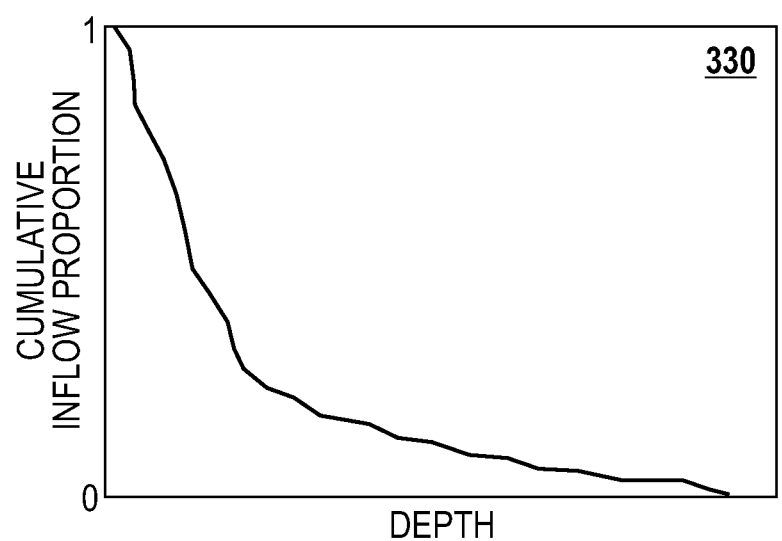
FIG. 6 is an exemplary production log generated from a noise log, according to an embodiment.

Another option for interpreting the noise logs 300/304 is to consider the cumulative summation of the energy present between filtering frequencies, which can produce an estimate of inflow allocation. This information can be presented as a production log that plots inflow allocation versus depth. An example of a production log 330 is shown in FIG. 6. A log of cumulative inflow, such as the log 330, shows the proportion of total produced flow rate present at each location in the well, cumulatively over depth. For example, at the bottom of the well, 0% of production has entered the well. At the surface, 100% of production has entered the well. In between these locations the log of cumulative inflow will form a curve. Viewing the log gives information regarding which zones of the reservoir are producing fluids into the well and so allows targeted interventions such as stimulation. One of the benefits of a cumulative inflow log produced using the techniques and systems described herein is that inflow can be monitored at all locations while varying the production rate and drawdown. It is therefore possible to determine how the well and reservoir behave at different production conditions.

Yet another option that can be used to interpret the noise logs 300/304 is to consider only the peaks in a trace of energy versus depth for a particular filtering frequency. When high pass filtering is used, such peaks indicate high energy above the filtering frequency. When the frequency has been correctly selected, a peak at a particular location can indicate the presence of inflow, outflow or other flow phenomena.

Unlike noise logs taken using a point sensor (e.g., a microphone) or an array of point sensors that must be raised and lowered in the well to log the entire region of interest, each of noise logs 300/304 in FIGS. 3A and 3B (which were generated using DVS data) represents simultaneous measurements taken at different depths. Not only do DVS measurements provide a much quicker method for generating a noise log and, thus, understanding flow conditions in a real time or near real time manner, but a DVS noise log also provides an opportunity to detect transient fluid flow conditions (e.g., slugs) that could not be detected using previous measurement techniques.

Variations on the techniques described herein are contemplated and within the scope of the invention. For instance, a noise log can be generated without performing all of the steps shown in FIG. 5, or additional steps may be performed. As another example, the extracted data need not be spatially filtered prior to high pass filtering. As yet another example, both amplitude and phase information, or only amplitude information, may be extracted from the detected backscatter.

The workflow 310 for generating the noise logs 300/304 can be implemented in hardware, software, firmware, or any combination thereof. The entire workflow 310 for generating the noise log 300 can be performed local to the monitoring system, a portion of the workflow may be performed remote from the location of the monitoring system, or all of the workflow can be performed remote from the monitoring system location. Interpretation of the noise log 300 also can be performed by software and/or firmware. Alternatively, in some embodiments, a visual display of the noise log 300 can be generated and displayed or printed as shown in block 326 of FIG. 5, and all or a portion of the interpretation can be performed by a user who has access to the noise logs 300/304 generated by the processing system 130.

Embodiments described herein can be used to monitor and interpret fluid flow in hydrocarbon-producing wells, injection wells, pipelines and any other structure or well in which a fluid flow is present. The techniques described herein can be used alone to gain an understanding of fluid flow or can be used in conjunction with monitoring of other parameters, such as temperature, which can be used either to provide further information or to adjust the vibration data.

While the invention has been disclosed with respect to a limited number of embodiments, those skilled in the art, having the benefit of this disclosure, will appreciate numerous modifications and variations there from. It is intended that the appended claims cover such modifications and variations as fall within the true spirit and scope of the invention.

What is claimed is:

1. A method of determining a characteristic of fluid flow in a region of interest, comprising:
    acquiring distributed vibration data from optical backscatter generated in response to an interrogating pulse of optical energy launched into an optical fiber deployed in a region of interest having a fluid flow, the optical fiber providing the response distributed along its length to incident vibration imparted on the optical fiber by the fluid flow in the region of interest;
    generating a noise log from the distributed vibration data, the noise log including a plurality of traces, each trace representing vibration energy below or above a selected frequency at a plurality of locations in the region of interest, wherein the selected frequency for each trace is different than the selected frequency for each other trace; and determining a characteristic of the fluid flow in the region of interest based on the plurality of traces.

2. The method as recited in claim 1, wherein determining the characteristic of the fluid flow comprises identifying from the noise log a peak in vibration energy at a particular location in the region of interest.

3. The method as recited in claim 1, further, comprising displaying the noise log to a user.

4. The method as recited in claim 1, further comprising:
generating a second noise log from the distributed vibration data, the second noise log including a plurality of second traces, each second trace representing vibration, energy above or below a different one of the selected frequencies at a plurality of locations in the region of interest,
wherein the noise log is generated from a first subset of the distributed vibration data generated by the optical fiber during a first time window, and the second noise log is generated from a second subset of the distributed vibration data generated by the optical fiber during a second time window; and
wherein determining a characteristic of the fluid flow in the region of interest comprises comparing the traces of the noise log to the second traces of the second noise log.

5. The method as recited in claim 1, further comprising:
generating a plurality of noise logs from the distributed vibration data, each noise log generated from a subset of the distributed vibration data generated by the optical fiber during a different time window; and
wherein determining a characteristic of the fluid flow in the region of interest comprises presenting the plurality of noise logs as a dynamic noise log representing fluid flow in the region of interest over a time period corresponding to the different time windows.

6. The method as recited in claim 1, further comprising selecting a selected frequency based on a vibration frequency associated with a structure in the region of interest.

7. The method as recited in claim 1, wherein the region of interest is a hydrocarbon-bearing subterranean formation.

8. The method as recited in claim 1, wherein determining the characteristic of the fluid, flow comprises determining differences between a first trace and a second trace of the plurality of traces of the noise log at a plurality of locations in the region of interest, wherein the difference between the first and second traces at a location is indicative of a rate of fluid flow at the location.

9. The method as recited in claim 8, wherein a larger difference between the first trace and the second trace at a location is indicative of a larger inflow compared to an inflow at a location having a smaller difference between the first trace and the second trace.

10. The method as recited in claim 1, wherein generating the noise log comprises high pass filtering the distributed vibration data at each of the selected frequencies.

11. The method as recited in claim 10, wherein generating the noise log further comprises determining, for each trace, an energy of the filtered distributed vibration data at each of a plurality of locations in the region of interest.

12. The method as recited in claim 11, wherein generating the noise log further comprises smoothing the filtered energy.

13. A method of determining a characteristic of fluid flow in a region of interest, comprising:
acquiring distributed vibration data from optical backscatter generated in response to an interrogating pulse of optical energy launched into an optical fiber deployed in a region of interest having a fluid flow, the optical fiber providing the response distributed along its length to incident vibration imparted on the optical fiber by the fluid flow;
generating a noise log from the distributed vibration data, the noise log including a plurality of, traces, each trace representing vibration energy below or above a selected frequency at a plurality of locations in the region of interest; and
determining a characteristic of the fluid flow in the region of interest based on the noise log by comparing two traces of the plurality of traces to identify a difference in the vibration energy at one or more locations in the region of, interest, wherein the identified difference in the vibration energy at a ˜articular location of the one or more locations is indicative of the characteristic of the fluid flow at the particular location.

14. The method as recited in claim 13, wherein a magnitude of the identified difference in the vibration energy at the particular location is indicative of a magnitude of a fluid inflow at the particular location.

* * * * *